(12) United States Patent
Xie

(10) Patent No.: US 6,382,787 B1
(45) Date of Patent: May 7, 2002

(54) SPECTACLES SET WITH A DETACHABLE SUNGLASSES FOR MOUNTING ON A PRIMARY SPECTACLE FRAME BY MEANS OF MAGNETIC ATTRACTION AND INTERLOCKING ENGAGEMENT

(76) Inventor: Yiling Xie, 10699 Hickson St., #23, El Monte, CA (US) 91731

( * ) Notice: Subject to any disclaimer, the term of this patent is extended or adjusted under 35 U.S.C. 154(b) by 0 days.

(21) Appl. No.: 09/731,561

(22) Filed: Dec. 6, 2000

(51) Int. Cl.[7] .................................................. G02C 9/00
(52) U.S. Cl. .......................................... 351/47; 351/57
(58) Field of Search .............................. 381/47, 57, 48, 381/58, 41

(56) References Cited

U.S. PATENT DOCUMENTS

| | | | |
|---|---|---|---|
| 5,416,537 A | 5/1995 | Sadler | 351/57 |
| 5,568,207 A | 10/1996 | Chao | 351/57 |
| 5,642,177 A | 6/1997 | Nishioka | 351/47 |
| 5,737,054 A | 4/1998 | Chao | 351/47 |
| 5,975,691 A | 11/1999 | Ku | 351/47 |
| 6,139,141 A | * 10/2000 | Zider | 351/47 |

* cited by examiner

Primary Examiner—Hung Xuan Dang
(74) Attorney, Agent, or Firm—Raymond Y. Chan; David and Raymond Patent Group

(57) ABSTRACT

A spectacles set includes a primary spectacle frame and a detachable sunglasses adapted for mounting in front of the primary spectacle frame. The detachable sunglasses includes a shelter frame for supporting two auxiliary lenses including a clip bridge extended between the two auxiliary lenses for securely engaging with the primary bridge of the primary spectacle frame and a pair of magnetic attaching arrangement connected thereto for holding the shelter frame on the primary spectacle frame in position. Each of the magnetic attaching arrangement includes a supporting arm extending rearwardly from an inner side of the auxiliary lens of the shelter frame towards the magnetic holder of the primary spectacle frame and a magnetic seat which is connected to the supporting arm and extended to magnetically attaching to the magnetic holder of the primary spectacle frame so as to hold the shelter frame on the primary spectacle frame in position.

20 Claims, 7 Drawing Sheets

SPECTACLES SET WITH A DETACHABLE SUNGLASSES FOR MOUNTING ON A PRIMARY SPECTACLE FRAME BY MEANS OF MAGNETIC ATTRACTION AND INTERLOCKING ENGAGEMENT

BACKGROUND OF THE PRESENT INVENTION

1. Field of Invention

The present invention relates to spectacle frame, and more particularly to a spectacles set with detachable sunglasses which is adapted for mounting on a primary spectacle frame by means of magnetic attraction and interlocking engagement.

2. Description of Related Arts

Shelter frames are widely used today. A conventional shelter frame such as clip-on sunglasses comprises a plurality of clipping claws for detachably mounting on short-sighted or farsighted sunglasses so that the wearer does not need to carry and pay for another pair of shortsighted or farsighted sunglasses. However, the metal made clipping claws may scratch the lenses of the primary eyeglasses during the mounting process. Also, the wear requires both hands to align and engage the conventional clip-on sunglasses on the primary eyeglasses in correct position. It is troublesome and dangerous for a wearer to use his or her both hands to wear such clip-on sunglasses on the regular glasses while he or she is driving.

In order to solve the problem of the above mentioned clip-on sunglasses, magnetic attachment is recently introduced into the eyeglasses industry, such as U.S. Pat. Nos. 5,416,537, 5,568,207, 5,642,177, 5,737,054, and 5,975,691. For example, in U.S. Pat. No. 5,568,207, a primary pair of magnet members is affixed on two side extensions of a primary spectacle frame respectively. A shelter frame, such as a sunglasses, includes a pair of arms for resting over the upper side extensions for preventing the shelter frame from moving downward relative to the primary spectacle for engaging with the primary magnet members of the primary spectacle frame so as to stably attach the shelter frame to the primary spectacle frame. However, the users have to align two pairs of magnet members. If the auxiliary magnet members of the sunglasses are misaligned with the primary magnet members of the primary spectacle frame, the sunglass will fall down from the primary spectacle frame easily.

Thus, the major drawback of the primary spectacle equipped with the magnet attachment is that the magnet members embedded into the primary spectacle generate magnetic field. Since the two magnet members are positioned close to the eyes and brain of the wearer, the magnetic field may affect his or her health, such as eye infection or headache, especially to those shortsight wearers who normally need to wear the primary spectacle frame all day long.

SUMMARY OF THE PRESENT INVENTION

A main object of the present invention is to provide a spectacles set with detachable sunglasses, wherein the detachable sunglasses is adapted for precisely and easily attaching on a primary spectacle frame by means of a magnetic engaging arrangement so as to securely mount on the primary spectacle frame without the risk of scratching the lenses of the primary spectacle frame.

Another object of the present invention is to provide a spectacles set with detachable sunglasses, wherein no magnet is needed to embed into the primary spectacle frame such that no magnetic field is generated around the primary spectacle frame to affect the wearer's health while he or she normally wears the primary spectacle frame.

Another object of the present invention is to provide a spectacles set with detachable sunglasses which comprises a bridge clip for securely mounting on a primary bridge of the primary spectacle and two supporting arm for respectively holding two inner sides of two lens of the primary spectacle in position, so as to prevent up and down movement or sideward movement of the detachable sunglasses with respect to the primary spectacle frame.

Another object of the present invention is to provide a spectacles set with detachable sunglasses, wherein the wearer may merely use one hand to attach or detach the detachable sunglasses during exercising or driving.

Another object of the present invention is to provide a spectacles set with detachable sunglasses, which does not require to change the original structural design of the primary spectacle frame.

Accordingly, in order to accomplish the above objects, the present invention provide a spectacles set with detachable sunglasses adapted for mounting in front of a primary spectacle frame which comprises a frame body for mounting a pair of lenses in position. The frame body comprises a primary bridge connected between the two lenses, two magnetic holders each having magnetic attraction ability provided at two inner sides of the lenses respectively wherein two nose supports are firmly affixed to the two magnetic holders respectively, and two side extensions provided at two outer sides of the lenses respectively wherein each of the two side extensions has a hinge portion extended rearwardly therefrom for pivotally coupling a temple.

The detachable sunglasses comprises a shelter frame for supporting two auxiliary lenses comprising a clip bridge extended between the two auxiliary lenses for securely engaging with the primary bridge of the primary spectacle frame and a pair of magnetic attaching arrangements connected thereto for holding the shelter frame on the primary spectacle frame in position.

Each of the magnetic attaching arrangements comprises a supporting arm extending rearwardly from an inner side of the auxiliary lens of the shelter frame towards the magnetic holder of the primary spectacle frame and a magnetic seat which is connected to the supporting arm and extended to magnetically attaching to the magnetic holder of the primary spectacle frame so as to hold the shelter frame on the primary spectacle frame in position.

DETAILED DESCRIPTION OF THE PREFERRED EMBODIMENTS

Figure 1:
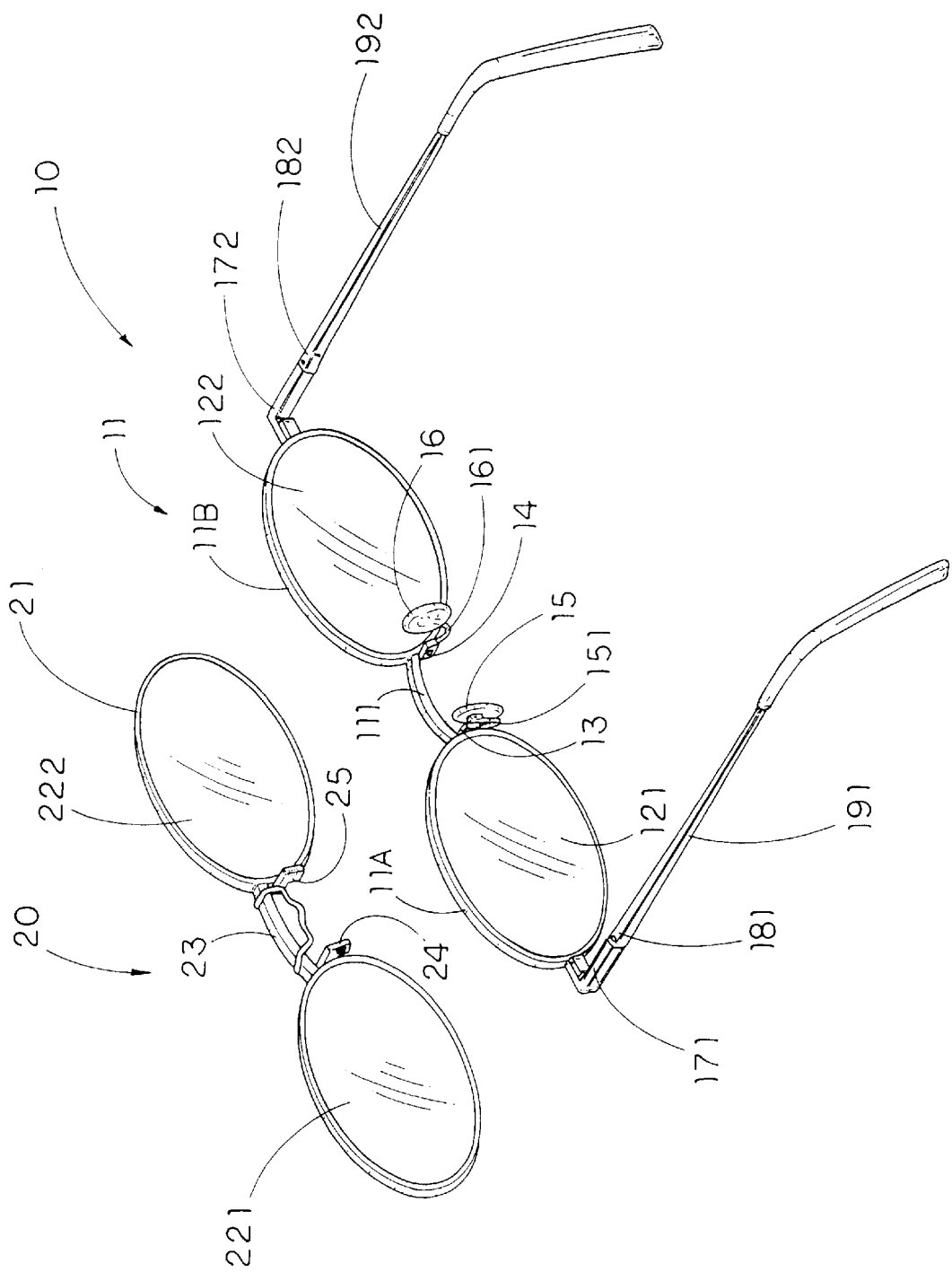
FIG. 1 is a rear perspective view of a spectacles set according to a first preferred embodiment of the present invention.

Referring to FIG. 1 of the drawings, a spectacles set according to a preferred embodiment of the present invention is illustrated, wherein the spectacles set comprises a primary spectacle frame 10 and a detachable sunglasses 20 adapted for mounting in front of the primary spectacle frame 10.

The primary spectacle frame 10, such as a conventional spectacle frame, comprises a frame body 11 for mounting a pair of lenses 121, 122 in position. The frame body 11 comprises a primary bridge 111 connected between the two lenses 121, 122 respectively, two magnetic holders 13, 14 each having magnetic attraction ability provided at two inner sides of the lenses 121, 122 respectively wherein two nose supports 15, 16 are firmly affixed to the two magnetic holders 13, 14 respectively, and two side extensions 171, 172 provided at two outer sides of the lenses 121, 122 respectively wherein each of the two side extensions 171, 172 has a hinge portion 181, 182 extended rearwardly therefrom for pivotally coupling a temple 191, 192.

Figure 5:
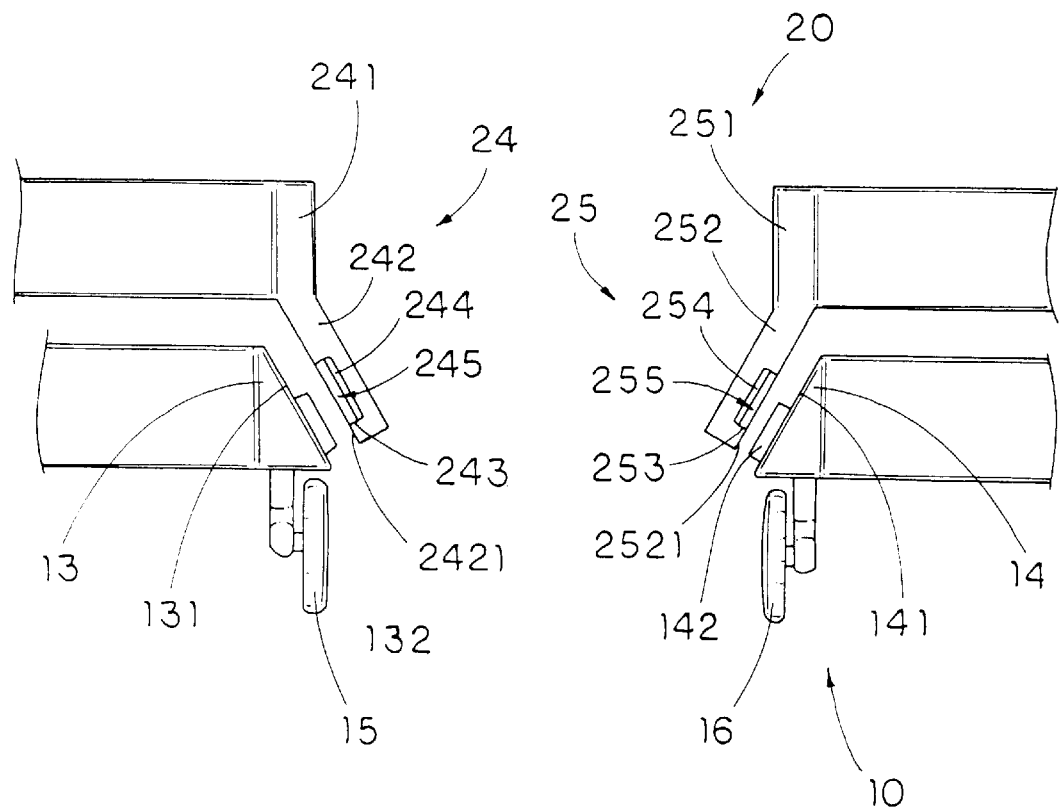
FIG. 5 is a partially enlarged top view of the spectacles set according to the above first preferred embodiment of the present invention.

The frame body 11 of the primary spectacle frame 10 can be constructed as the conventional spectacle frame to have a pair of lens rims 11A, 11B, as shown in FIG. 1, or the rimless frame that the primary bridge 111 and two side extensions 171, 172 are directly fastened to the edges of the two lenses 121, 122, wherein the two magnetic holders 13, 14 are extended from two ends of the primary bridge 111, as shown in FIG. 5. In other words, the primary spectacle frame 10 does not require to modify its original structure for mounting the detachable sunglasses 20 thereon.

As shown in FIG. 1, each of the two nose supports 15, 16 has a U-shaped nose supporting arm 151, 161 extended therefrom wherein the nose supporting arm 151, 161 is securely connected to a bottom end of the magnetic holder 13, 14. Each of the magnetic holders 13, 14 is made of a kind of metal having magnetic attraction ability such as mild steel, low carbon steel and high grade steel, which is attractive to magnetic material such as permanent magnet.

The detachable sunglasses 20 comprises a shelter frame 21 for supporting two auxiliary lenses 221, 222 comprising a clip bridge 23 extended between the two auxiliary lenses 221, 222 for securely engaging with the primary bridge 111 of the primary spectacle frame 10 and a pair of magnetic attaching arrangements 24, 25 connected thereto for holding the shelter frame 21 on the primary spectacle frame 10 in position.

The clip bridge 23 of the shelter frame 21 of the detachable sunglasses 20 is in U-shaped and further comprises two rearwardly extending side wires 231 adapted for supporting on two ends of the primary bridge 111 of the frame body 11 and a downwardly curved clipping wire 232 extending behind the primary bridge 111, so that the clip bridge 23 is securely clipped on the primary bridge 111 when the detachable sunglasses 20 is mounted in front of the primary spectacle frame 10.

Figure 2:
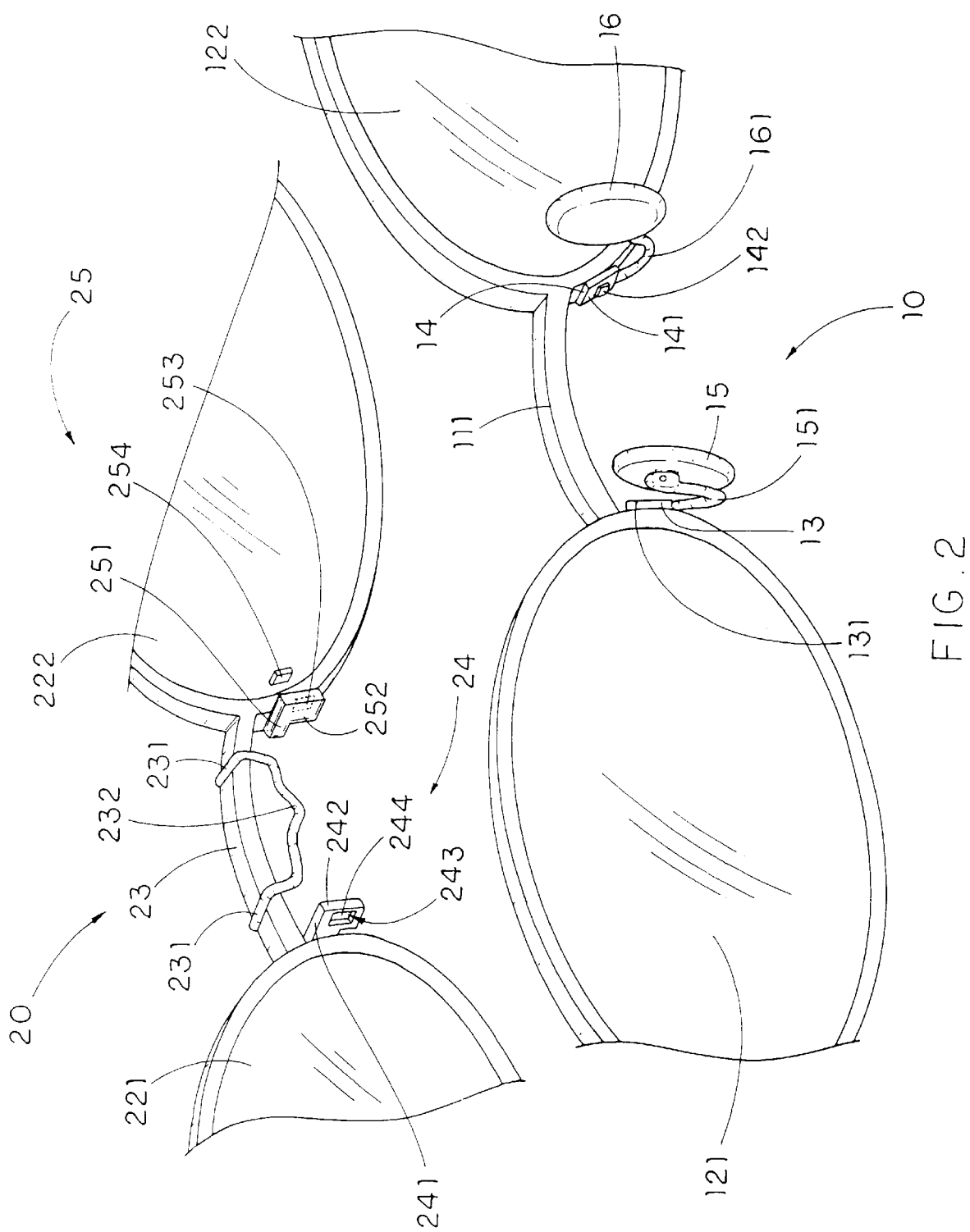
FIG. 2 is a partial enlarged perspective view of a magnetic attaching arrangement of the detachable sunglasses according to the above first preferred embodiment of the present invention.

As shown in FIG. 2, each of the magnetic attaching arrangements 24, 25 comprises a supporting arm 241, 251 extending rearwardly from an inner side of the auxiliary lens 221, 222 of the shelter frame 21 towards the magnetic holder 13, 14 of the primary spectacle frame 10 and a magnetic seat 242, 252 which is connected to the supporting arm 241, 242 and arranged to magnetically attach to the magnetic holder 13, 14 of the primary spectacle frame 10 so as to hold the shelter frame 21 of the sunglasses 20 on the frame body 11 of the primary spectacle frame 10 in position.

Each of the magnetic seats 242, 252 comprises a magnetic housing 243, 253 rearwardly extended from the respective supporting arm 241, 251 wherein each magnetic seat 242, 252 is made of non-magnetic material or soft-magnetic metal having magnetic attraction ability such as mild steel, low carbon steel and high grade steel and a magnet 244, 254 mounted in the magnetic housing 243, 253, which is arranged to face toward and align with the respective magnetic holder 13, 14 of the shelter frame 21 when the detachable sunglasses 20 is mounted in front of the primary spectacle frame 10.

Figure 3:
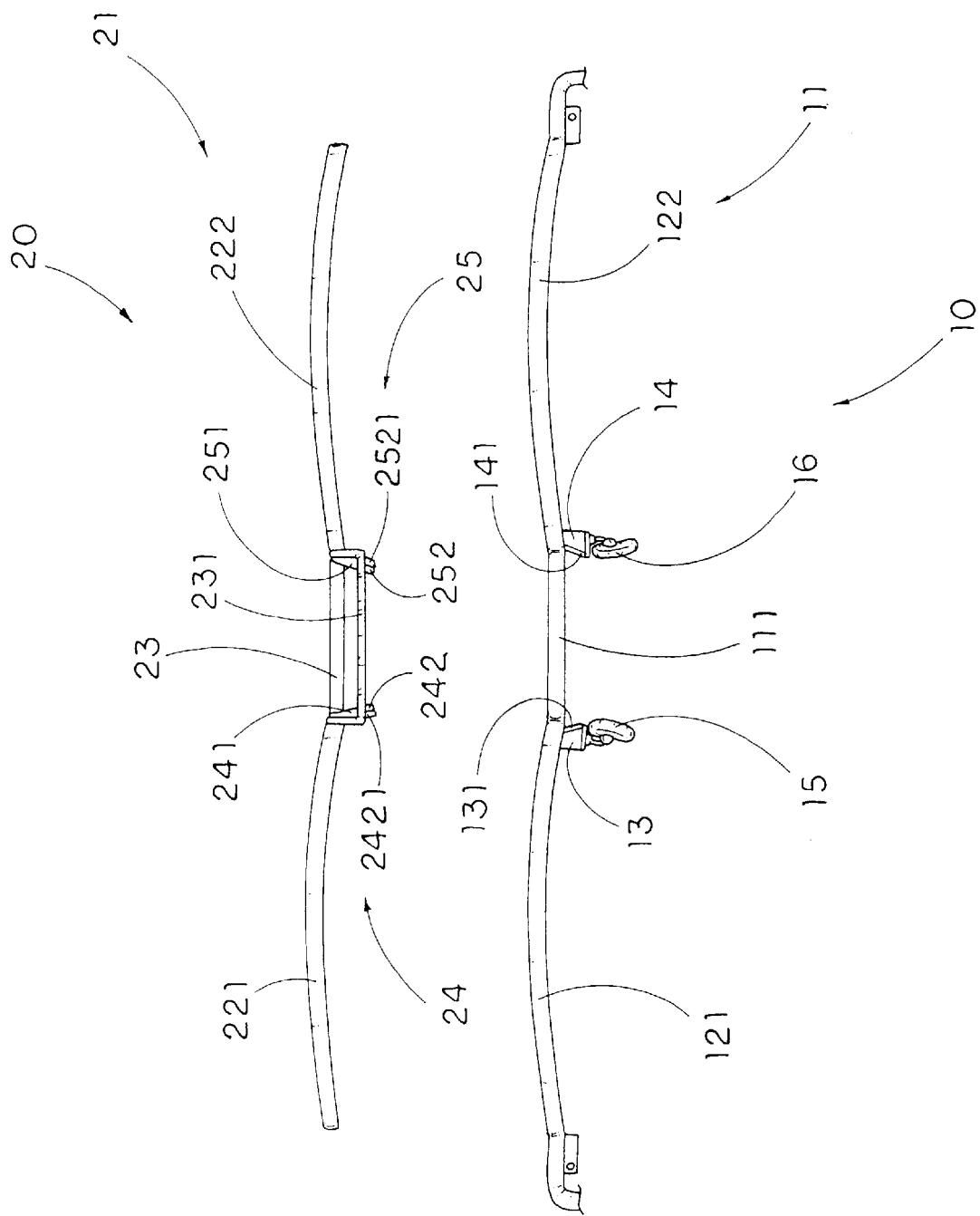
FIG. 3 is a top view of the spectacles set according to the above first preferred embodiment of the present invention.

According to FIG. 3, the two supporting arms 241, 251 are inwardly extended from the shelter frame 21 of the detachable sunglasses 20 in such a manner that the two magnetic seats 242, 252 are easy to align with the magnetic holders 13, 14 when the sunglasses 20 is mounted in front of the primary spectacle frame 10. In other words, a distance between the two auxiliary lenses 221, 222 where the two supporting arms 241, 251 extended therefrom is wider than a distance between the two magnetic holders 13, 14 of the frame body 11 of the primary spectacle frame 10.

Each of the magnetic seats 242, 252 has an outer surface 2421, 2521 adapted for fittedly engaging with an inner surface 131, 141 of the respective magnetic holder 13, 14 when the magnetic seats 242, 252 are magnetically engaged with the magnetic holders 13, 14 respectively. The outer surfaces 2421, 2521 of the magnetic seats 242, 252 are slanted outwardly for fittedly engaging with the inner surfaces 131, 141 of the magnetic holders 13, 14 which are slanted inwardly, as shown in FIG. 3. Since the detachable sunglasses 20 is mounted in front of the primary spectacle frame 10, the slanted outer surfaces 2421, 2521 of the two magnetic seats 242, 252 and the slanted inner surfaces 131, 141 of the magnetic holders 13, 14 will guide and enhance the engagement and the alignment between the magnetic seats 242, 252 and the magnetic holders 13, 14, so as to mount the detachable sunglasses 20 in front of the primary spectacle frame 10 easily.

Moreover, as shown in FIG. 5, two engaging members 132, 142 are integrally protruded from the two slanted inner surfaces 131, 141 of the magnetic holders 13, 14 respectively in such a manner that the two engaging members 132, 142 are also made of soft magnetic metal which is attractive to magnetic material such as permanent magnet. Each magnet 244, 254 has a thickness smaller than a depth of the respective magnetic housing 243, 253 so as to define an engaging groove 245, 255, so that the magnet 244, 254 is embedded in the magnetic housing 243, 253 for fittedly engaging with the respective engaging member 132,142. In other words, the two engaging grooves 245, 255 are formed on the two outer surfaces 2421, 2521 of the two magnetic seats 242, 252 for fittedly engaging with the two engaging members 132, 142 of the two inner surfaces 131, 141 of the two magnetic holders 13, 14 respectively, so as to further guide the two magnetic attaching arrangement 24, 25 to magnetically attach to the two magnetic holder 13, 14 respectively.

Figure 6:
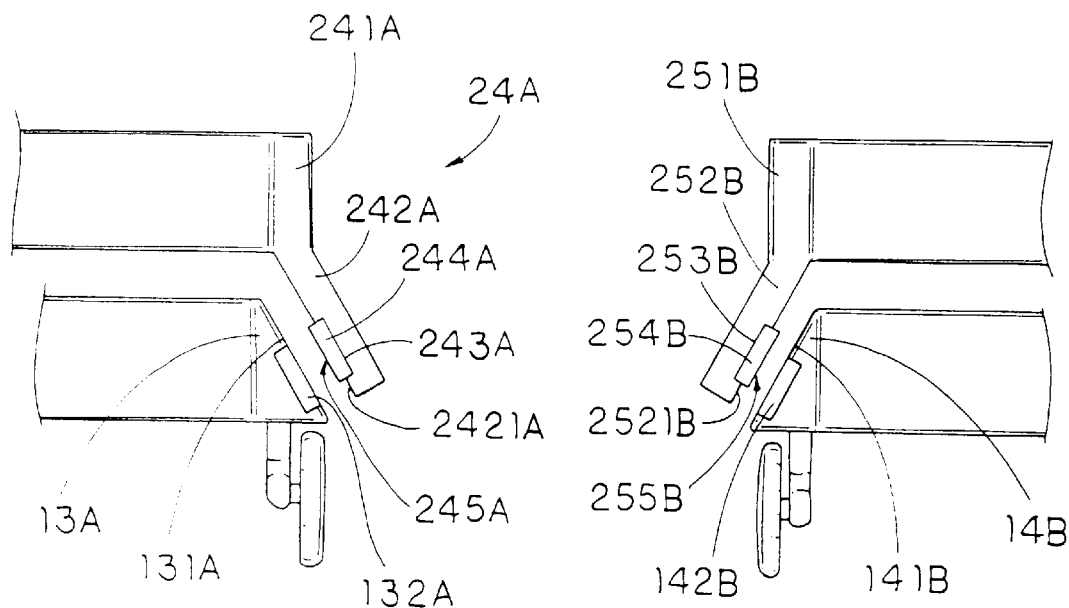
FIG. 6 illustrates an alternative mode of the spectacles set according to the above first preferred embodiment of the present invention.

Alternatively, each magnet 244A, 254A has a thickness larger than the depth of the respective magnetic housing 243A, 253A so as to define the engaging member 245A, 255A on the slanted outer surface 2421A, 2521A, wherein the magnet 244A, 254A is embedded in the magnetic housing 243A, 253A for fittedly engaging the respective engaging groove 132A, 142A indented on the slanted inner surface 131A, 141A of the magnetic holder 13A, 14A, as shown in FIG. 6.

Figure 4:
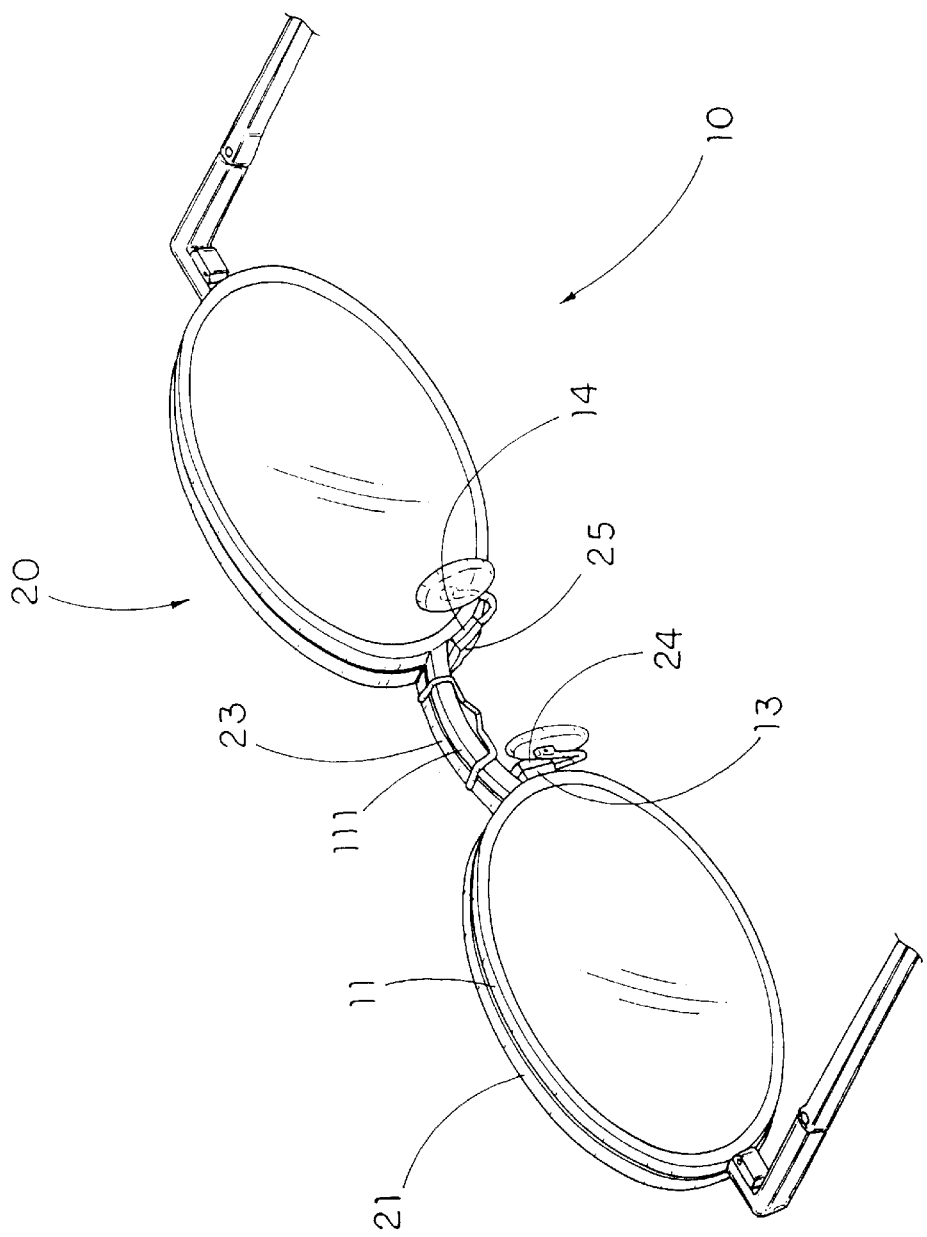
FIG. 4 is a partial rear perspective view of the detachable sunglasses mounted on the primary spectacle frame according to the above first preferred embodiment of the present invention.

In order to mount the detachable sunglasses 20 in front of the primary spectacle frame 10, the user may simply use one hand to put the shelter frame 21 in front of the frame body 11 and drop it down. The clip bridge 23 is securely clipped on the primary ridge 111 so as to securely interlock the shelter frame 21 with the frame body 11. Moreover, due to the magnetic attraction, the two magnetic seats 242, 252 of the shelter frame 21 are magnetically attracted to the magnetic holders 13, 14 of the frame body 11 respectively. The inwardly extending supporting arms 241, 251 further guide the two magnetic seats 242, 252 to automatically align with the two magnetic holders 13, 14 respectively in such a manner that the slanted outer surfaces 2421, 2521 of the two magnetic seats 242, 252 are magnetically engaged with the slanted inner surfaces 131, 141 of the magnetic holders 13, 14, so as to hold the shelter frame 21 on the frame body 11 in position, as shown in FIG. 4. So, the present invention provides not only the magnetic attraction but also the interlocking engagement for securely mounting the detachable sunglasses 20 in front of the primary spectacle 10.

The user can also detach the shelter frame 21 of the sunglasses 20 from the frame body 11 of the primary spectacle frame 10 easily by slightly pulling the shelter frame 21 away from the primary spectacle frame 10 until the two magnetic seats 242, 252 move frontwardly apart from the two magnetic holders 13, 14, so as to release the magnetic engagement between the shelter frame 21 and the frame body 11. Then, at the same time, the user may detach the shelter frame 21 by simply lifting it up from the primary spectacle frame 10 with one hand, so as to detach the clip bridge 23 from the primary bridge 111 of the frame body 11. In other words, the user may merely use one hand to attach or detach the detachable sunglasses 20 from the primary spectacle frame 10 especially when the user is exercising or driving that it is dangerous for him or her to user both hands to wear the detachable sunglasses.

It is worth to mention that since the two nose supports 15, 16 are affixed to the bottom ends of the magnetic holders 13, 14 respectively, the two supporting arms 241, 251 can extended near to the magnetic holders 13, 14, so as to minimize a distance between the detachable sunglasses 20 and the primary spectacle frame 10.

Figure 7:
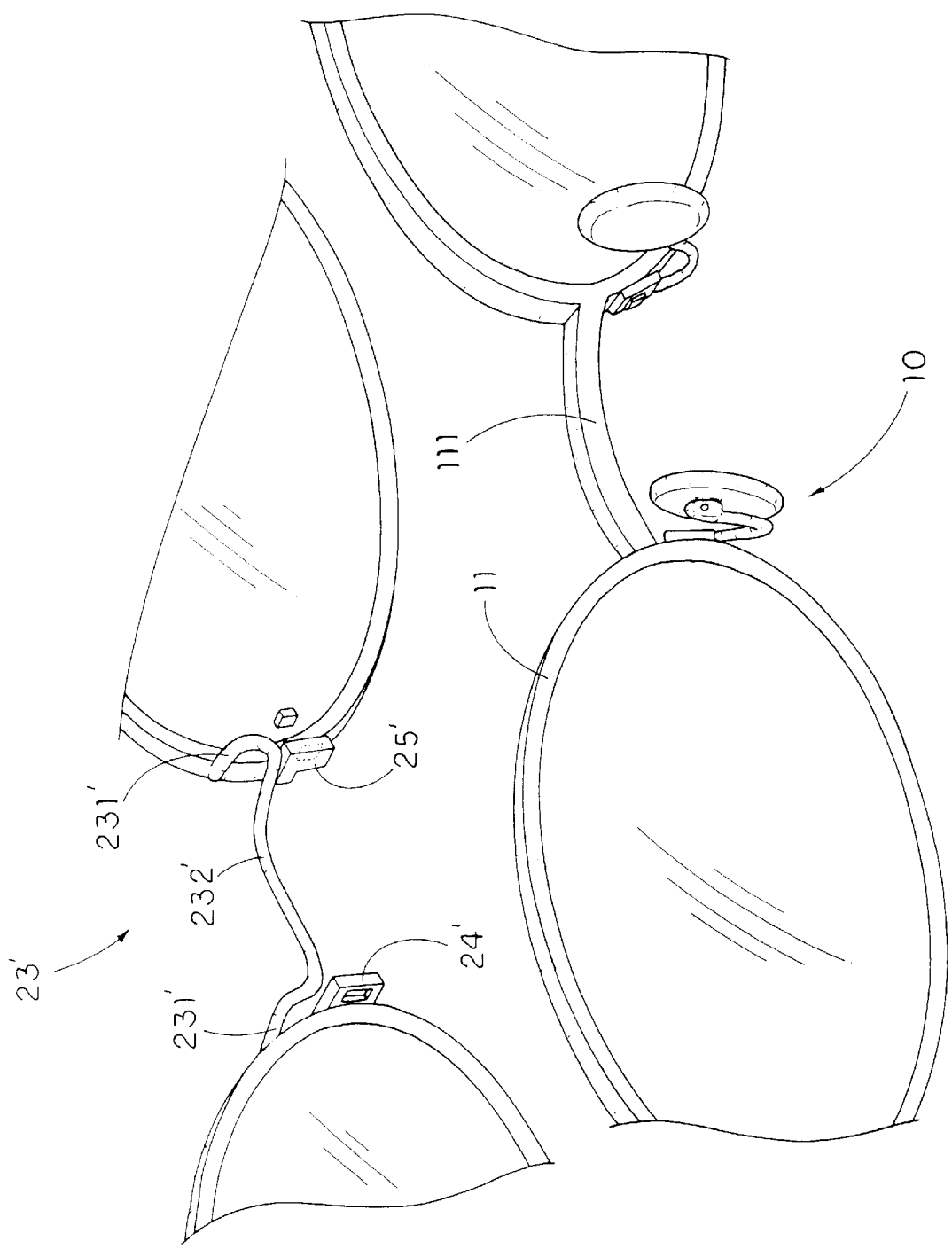
FIG. 7 illustrates an alternative mode of a clip bridge of the detachable sunglasses of the spectacles set according to the above first preferred embodiment of the present invention.

As shown in FIG. 7, an alternative mode of the clip bridge 23' of the detachable sunglasses 20' is illustrated, wherein the structure of the magnetic attaching arrangement 24', 25' of the detachable sunglasses 20' are the same as mentioned above. The clip bridge 23' comprises two rearwardly extending side wires adapted for supporting on two ends of the primary bridge 111 of the frame body 11 and a W-shaped downwardly curved wire 232' extending behind the primary bridge 111, so that the clip bridge 23' is adapted for clipping on the primary bridge 111 when the detachable sunglass 20' is mounted in front of the primary spectacle frame 10.

Figure 8:
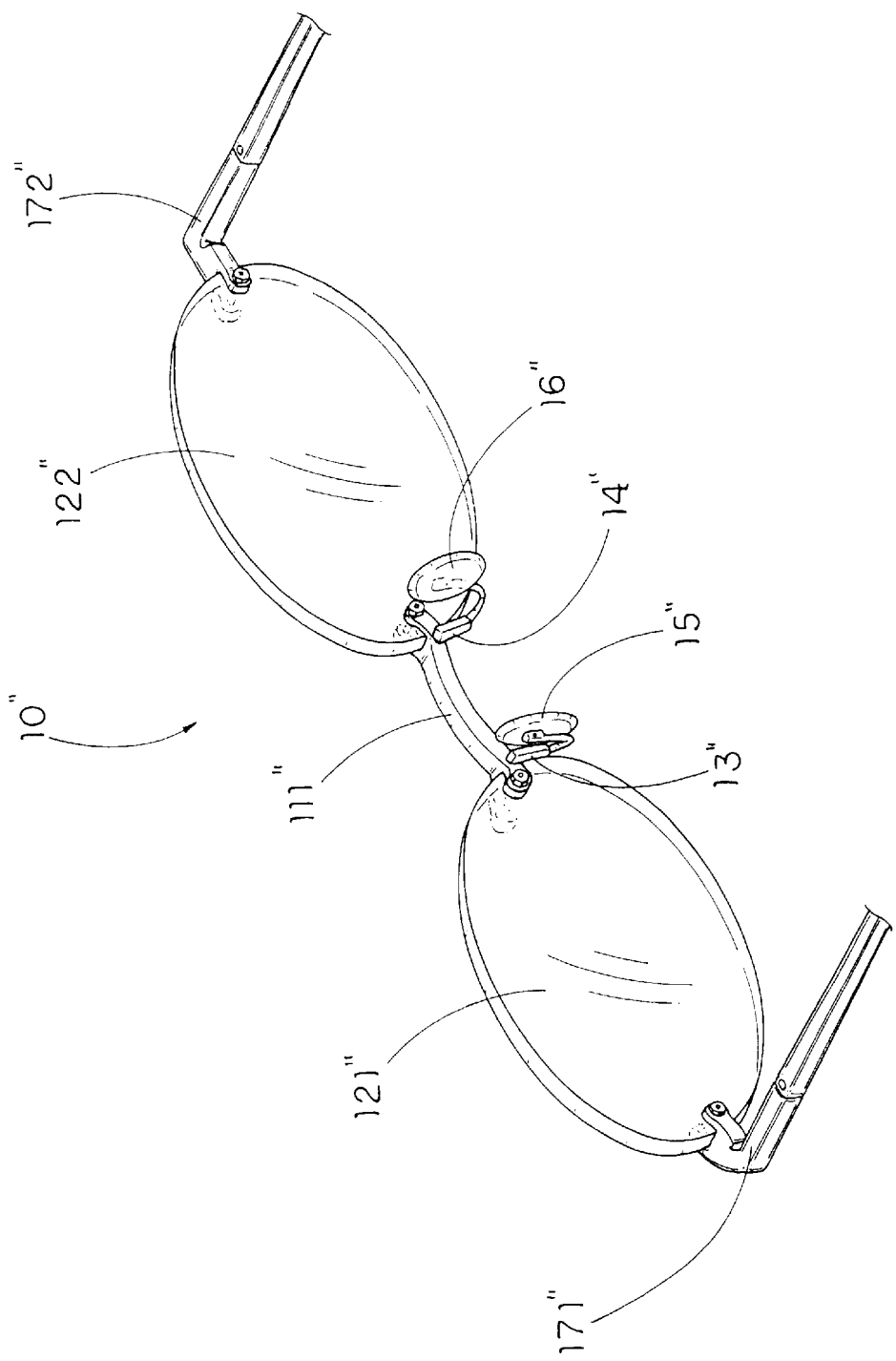
FIG. 8 is a rear perspective view of a primary spectacle frame of the spectacles set according to a second preferred embodiment of the present invention.

Referring to FIG. 8, a primary spectacle frame 10" according to a second preferred embodiment of the present invention is illustrated, wherein the attraction and engagement concept and structure of the second embodiment is same as the above first embodiment. The detachable sunglasses 10 in the above embodiment and its alternative mode can also be used for mounting in front of the rimless primary spectacle frame 10' of the second embodiment, wherein the two side extensions 171", 172" and the primary bridge 111" are directly fastened to the edges of the two lenses 121", 122".

According to the second embodiment, the primary bridge 111" is connected between the two lenses 121", 122" by means of two nuts for fastening two ends of the primary bridge 111" at two edges of the lenses 121", 122" respectively. The two magnetic holder 13" 14" are downwardly extended from the primary bridge 111' wherein the two nose supports 15", 16" are firmly affixed to bottom ends of the two magnetic holder 13", 14" respectively. Each of the magnetic holders 13", 14" is made of softmagnetic metal having magnetic attraction ability such as mild steel, low carbon steel, and high grade steel, which is attractive to magnetic material such as permanent magnet. So, the detachable sunglasses 20 of the first embodiment is also adapted for mounting on the primary spectacle frame 10" of the second embodiment as the same method as it is mentioned above.

Since the primary spectacle frame 10, 10' according to the first and second embodiments does not employed with any magnet, no magnetic field is produced around the primary spectacle frame 10, 10' so that the user is able to wear the primary spectacle frame 10, 10' as usually without affecting by the magnetic field. Thus, both the interlocking engagement and the magnetic attraction are provided by the present invention in order to securely mount the detachable sunglasses 20 in front of the primary spectacle frame 10, 10'.

What is claimed is:

1. A spectacles set, comprising a primary spectacle frame and a detachable sunglasses adapted for mounting in front of the primary spectacle, said primary spectacle frame comprising a frame body for mounting a pair of lenses in position, wherein said frame body comprises a primary bridge connected between said two lenses, two magnetic holders each of which has magnetic attraction ability being provided at two inner sides of said lenses respectively, two nose supports attached to said two magnetic holders respectively, and two side extensions provided at two outer sides of said lenses for coupling a pair of temples respectively;

said detachable sunglasses comprising a shelter frame for supporting two auxiliary lenses, wherein said shelter frame comprises a clip bridge extended between said two auxiliary lenses for securely engaging with said primary bridge of said primary spectacle frame and a pair of magnetic attaching arrangements connected to said shelter frame for holding said shelter frame on said primary spectacle frame in position;

each of said magnetic attaching arrangements comprising a supporting arm extending rearwardly from an inner side of said auxiliary lens of said shelter frame towards said respective magnetic holder of said primary spectacle frame and a magnetic seat which is connected to said supporting arm and extended to magnetically attaching to said magnetic holder of said primary spectacle frame so as to hold said shelter frame on said primary spectacle frame in position.

2. The spectacles set, as recited in claim 1, wherein each of said magnetic seats comprises a magnetic housing rearwardly extended from said respective supporting arm and a magnet mounted in said magnetic housing, wherein each said magnetic seat is made of non-magnetic material and is arranged to face toward and align with said respective magnetic holder of said shelter frame when said detachable sunglasses is mounted in front of said primary spectacle frame.

3. The spectacles set, as recited in claim 2, wherein said two supporting arms are inwardly extended from said shelter frame of said detachable sunglasses, wherein a distance between said two auxiliary lenses where said two supporting arms extended is wider than a distance between said two magnetic holders of said frame body of said primary spectacle frame.

4. The spectacles set, as recited in claim 3, wherein each of said magnetic seats has a slanted outer surface adapted for fittedly engaging with a slanted inner surface of said respective magnetic holder so as to guide said magnetic seats magnetically engaged with said magnetic holders respectively.

5. The spectacles set, as recited in claim 4, wherein each of said two nose supports, having a U-shaped nose supporting arm extended therefrom, is securely connected to a bottom end of said magnetic holder.

6. The spectacles set, as recited in claim 5, wherein said clip bridge of said detachable sunglasses further comprises two rearwardly extending side wires adapted for supporting on two ends of said primary bridge of said frame body and a downwardly curved clipping wire extending behind said primary bridge, so that said clip bridge is securely clipped on said primary bridge when said detachable sunglasses is mounted in front of said primary spectacle frame.

7. The spectacles set, as recited in claim 5, wherein said clip bridge of said detachable sunglasses comprises two rearwardly extending side wires adapted for supporting on two ends of said primary bridge of said frame body and a W-shaped downwardly curved clipping wire extending behind said primary bridge, wherein said clip bridge is capable of securely clipping on said primary bridge when said detachable sunglasses is mounted in front of said primary spectacle frame.

8. The spectacles set, as recited in claim 4, wherein said clip bridge of said detachable sunglasses farther comprises two rearwardly extending side wires supporting on two ends of said primary bridge of said frame body and a downwardly curved clipping wire extending behind said primary bridge, wherein said clip bridge is capable of securely clipping on said primary bridge when said detachable sunglasses is mounted in front of said primary spectacle frame.

9. The spectacles set, as recited in claim 4, wherein said clip bridge of said detachable sunglasses comprises two rearwardly extending side wires adapted for supporting on two ends of said primary bridge of said frame body and a W-shaped downwardly curved clipping wire extending behind said primary bridge, wherein said clip bridge is capable of securely clipping on said primary bridge when said detachable sunglasses is mounted in front of said primary spectacle frame.

10. The spectacles set, as recited in claim 4, wherein two ends of said primary bridge are directly connected to said two lenses respectively, wherein two magnetic holders are downwardly extended from said primary bridge and said two nose supports are firmly affixed to bottom ends of said two magnetic holder respectively.

11. The spectacles set, as recited in claim 10, wherein said clip bridge of said detachable sunglasses further comprises two rearwardly extending side wires adapted for supporting on two ends of said primary bridge of said frame body and a downwardly curved clipping wire extending behind said primary bridge, so that said clip bridge is securely clipped on said primary bridge when said detachable sunglasses is mounted in front of said primary spectacle frame.

12. The spectacles set, as recited in claim 10, wherein said clip bridge of said detachable sunglasses comprises two rearwardly extending side wires adapted for supporting on two ends of said primary bridge of said frame body and a W-shaped downwardly curved clipping wire extending behind said primary bridge, wherein said clip bridge is capable of securely clipping on said primary bridge when said detachable sunglasses is mounted in front of said primary spectacle frame.

13. The spectacles set, as recited in claim 3, wherein each of said two nose supports, having a U-shaped nose supporting arm extended therefrom, is securely connected to a bottom end of said magnetic holder.

14. The spectacles set, as recited in claim 3, wherein two ends of said primary bridge are directly connected to said two lenses respectively, wherein two magnetic holders are downwardly extended from said primary bridge and said two nose supports are firmly affixed to bottom ends of said two magnetic holder respectively.

15. The spectacles set, as recited in claim 14, wherein said clip bridge of said detachable sunglasses further comprises two rearwardly extending side wires adapted for supporting on two ends of said primary bridge of said frame body and a downwardly curved clipping wire extending behind said primary bridge, so that said clip bridge is securely clipped on said primary bridge when said detachable sunglasses is mounted in front of said primary spectacle frame.

16. The spectacles set, as recited in claim 14, wherein said clip bridge of said detachable sunglasses comprises two rearwardly extending side wires adapted for supporting on two ends of said primary bridge of said frame body and a W-shaped downwardly curved clipping wire extending behind said primary bridge, wherein said clip bridge is capable of securely clipping on said primary bridge when said detachable sunglasses is mounted in front of said primary spectacle frame.

17. The spectacles set, as recited in claim 1, wherein said two supporting arms are inwardly extended from said shelter frame of said detachable sunglasses, wherein a distance between said two auxiliary lenses where said two supporting arms extended is wider than a distance between said two magnetic holders of said frame body of said primary spectacle frame.

18. The spectacles set, as recited in claim 17, wherein each of said magnetic seats has a slanted outer surface adapted for fittedly engaging with a slanted inner surface of said respective magnetic holder so as to guide said magnetic seats magnetically engaged with said magnetic holders respectively.

19. The spectacles set, as recited in claim 18, wherein each of said two nose supports, having a U-shaped nose supporting arm extended therefrom, is securely connected to a bottom end of said magnetic holder.

20. The spectacles set, as recited in claim 1, wherein each of said magnetic seats has a slanted outer surface adapted for fittedly engaging with a slanted inner surface of said respective magnetic holder so as to guide said magnetic seats magnetically engaged with said magnetic holders respectively.

* * * * *